(12) United States Patent
Gaichies et al.

(10) Patent No.: US 8,644,465 B2
(45) Date of Patent: Feb. 4, 2014

(54) METHOD FOR PROCESSING AUDIO DATA ON A NETWORK AND DEVICE THEREFOR

(75) Inventors: Lilian François Gaichies, Paris (FR); Pascal Beglin, Paris (FR); Thomas Bouton, Saint-Mande (FR); Zakaria Nadhir, Paris (FR)

(73) Assignee: Streamwide, Paris (FR)

(*) Notice: Subject to any disclaimer, the term of this patent is extended or adjusted under 35 U.S.C. 154(b) by 910 days.

(21) Appl. No.: 10/536,320

(22) PCT Filed: Nov. 24, 2003

(86) PCT No.: PCT/FR03/03472
§ 371 (c)(1),
(2), (4) Date: May 26, 2005

(87) PCT Pub. No.: WO2004/051973
PCT Pub. Date: Jun. 17, 2004

(65) Prior Publication Data
US 2006/0047516 A1 Mar. 2, 2006

(30) Foreign Application Priority Data
Nov. 29, 2002 (FR) .................... 02 15026

(51) Int. Cl.
*H04M 1/64* (2006.01)
(52) U.S. Cl.
USPC ............... 379/88.17; 379/88.18; 379/266.07; 704/270.1; 709/218
(58) Field of Classification Search
USPC .................. 379/88.17, 258, 88.01–88.04, 379/265.01–266.1, 88.16, 88.18, 266.07; 704/270.1, 270; 709/218; 370/352, 370/526; 455/413
See application file for complete search history.

(56) References Cited

U.S. PATENT DOCUMENTS 6,456,699 B1 9/2002 Burg et al.
6,456,974 B1 9/2002 Baker et al.
(Continued)

FOREIGN PATENT DOCUMENTS

EP 1 175 074 A2 1/2002
EP 1 178 658 A2 2/2002
(Continued)

OTHER PUBLICATIONS

Japanese Patent Office Action, Final Notice of Rejection, Mailed Apr. 6, 2010, for Patent Application No. 2004-556417 (English Translation).

(Continued)

*Primary Examiner* — Md S Elahee
(74) *Attorney, Agent, or Firm* — Stites & Harbison PLLC; Jeffrey A. Haeberlin

(57) ABSTRACT

A method of processing a data stream comprising audio data exchanged over a network between a server (SERV) and at least one telephone terminal, the data stream corresponding to a telephone call from said terminal during which a user has produced at least one event. The method comprises a step a) consisting in extracting from the stream audio data (INST2) corresponding to each event, and a step b) consisting in executing at least one task relating to the extracted audio data (INST2) and executable by a software application (AL), the software application being designed to interact with the network by using a data transmission protocol that is not specifically audio. The method further comprises a step c) of introducing into said software application (AL) at least one instruction (INST2') relating to the extracted audio data (INST2) and adapted to activate the step b).

9 Claims, 3 Drawing Sheets

(56) References Cited

U.S. PATENT DOCUMENTS

| | | | |
|---|---|---|---|
| 6,654,722 B1 * | 11/2003 | Aldous et al. | 704/270.1 |
| 6,742,021 B1 * | 5/2004 | Halverson et al. | 709/218 |
| 7,024,363 B1 * | 4/2006 | Comerford et al. | 704/270 |
| 7,203,186 B1 * | 4/2007 | Fuller et al. | 370/352 |
| 2002/0057783 A1 | 5/2002 | Kredo et al. | |
| 2002/0098831 A1 * | 7/2002 | Castell et al. | 455/413 |

FOREIGN PATENT DOCUMENTS

| | | |
|---|---|---|
| GB | 2 307 619 A | 5/1997 |
| JP | 10-240493 | 9/1998 |
| WO | WO-97/40611 | 10/1997 |
| WO | WO 01/47218 A1 | 6/2001 |
| WO | WO 01/52477 A2 | 7/2001 |
| WO | WO 01/69427 A2 | 9/2001 |
| WO | WO-02/075605 | 9/2002 |

OTHER PUBLICATIONS

Japanese Patent Office, Decision of Dismissal of Amendment, dated Dec. 20, 2010, for counterpart Japanese Patent Application No. 2004-556417, translation of pp. 12-14.

* cited by examiner

METHOD FOR PROCESSING AUDIO DATA ON A NETWORK AND DEVICE THEREFOR

FIELD OF THE INVENTION

The present invention relates to methods and programs for processing audio data on a network, and also to apparatus for implementing the methods.

BACKGROUND OF THE INVENTION

More particularly, the invention relates to a method of processing a stream of data comprising audio data exchanged over a network between a server and at least one telephone terminal, the stream of data corresponding to a telephone call from the terminal during which a user has produced at least one event, the method comprising:

a step a) consisting in extracting from the data stream corresponding to each telephone call audio data corresponding to each event; and a step b) consisting in executing at least one task relating to the extracted audio data and executable by a software application.

Such prior art methods enable a telephone terminal and a server to communicate via a switched telephone network that may be public or private, fixed or mobile. By way of example, they correspond to the methods that are well known under the acronym IVR (interactive voice response).

For example, such methods enable information to be delivered in voice form to a user, or they enable operations to be controlled remotely from instructions given by the user in the form of audio data, such as voice commands or sounds generated when the user presses keys on the keypad of the telephone terminal (a method known under the acronym DTMF for "dual tone multi-frequency").

By means of this type of method, a user can consult a bank balance, or stock prices, and can consult or leave messages in a voice box, etc., for example.

During the telephone call, a data stream is generated from the telephone terminal. This data stream comprises, for example: identity (ID) data identifying the user, together with data corresponding to sounds issued by the user as picked up by the microphone of the telephone terminal, or as generated by pressing keys of the terminal. Amongst these sounds, some correspond to audio data characteristic of particular events.

When the audio data is identified by a suitable server, a program executes the corresponding task. For example, when the user utters the word "delete" that corresponds to an event that is intended, in a given context, to run the task that corresponds to deleting a message in a voice box.

In prior art methods, and in particular in the method described in document EP 1 175 074, computer programs corresponding to IVR applications are developed in special-purpose languages such as TCL (for tool command language), or require the use of interpreters such as VXML (for voice extensible markup language), etc. Such programs are all dedicated exclusively to voice applications, they are written exclusively in one such language, and the databases compatible with such programs are specific to those voice applications.

SUMMARY OF THE INVENTION

A particular object of the present invention is to make use of IVR type audio data communication methods available to more numerous sources.

This object is achieved by a method which, in addition to the characteristics specified above, is characterized by the facts that the software application is designed to interact with the network by using a data transmission protocol that is not specific to audio, and that the method includes a step c) which comprises inserting into said software application, through program elements that are specific to voice and added to the software application via an insertion sub-molecule, at least one instruction relating to the extracted audio data and adapted to activate step b).

In addition to already-existing voice applications, these dispositions make it is possible to use applications and databases compatible with such applications that have already been developed for implementing interaction between a server and a user other than by communicating solely with audio data. Thus, it is possible to use applications and databases that have already been developed, e.g. for the Internet, thus giving access to numerous sources of services and information that are already in existence.

This method also has the advantage that all applications already written in interpreted language, e.g. for the Internet, are immediately applicable to the voice domain, without needing to be completely redeveloped.

This method also makes it possible to integrate any new IVR application immediately in any telecommunications network that operates entirely in packet mode.

In preferred implementations of the invention, recourse may optionally also be had to one or more of the following dispositions:

the software application is written in a language, and the program elements specific to voice that are added to the software application are written in the same language;

the event is produced by the user pressing on at least one key of the telephone terminal;

the event is produced by the user uttering a voice command, and step a) includes a step consisting in recognizing the uttered voice command by means of a voice recognition unit;

the software application is adapted to execute tasks that are equivalent in terms of services given to the user whether implemented over an Internet or Intranet network or over a telephone network;

the method includes a step a') consisting in managing changes in the telephone call on the basis of non-audio data extracted from the data stream; and the method includes a step d) consisting in using a protocol for transmitting audio data over a network to transmit output audio data over the network as delivered in response to at least one event produced by the user.

In another aspect, the invention provides a system for processing a data stream comprising audio data exchanged over a network between a server and at least one telephone terminal, the data stream corresponding to a telephone call from said terminal during which a user has produced at least one event, the system comprising:

extraction means for extracting audio data corresponding to each event from the data stream corresponding to each telephone call; and execution means for executing at least one task relating to the extracted audio data and executable by a software application;

the system being characterized by the facts that the software application is designed to interact with the network by using a data transmission protocol that is not specifically audio, and that the system includes insertion means for inserting into said software application at least one instruction relating to the extracted audio data and adapted to be read and executed by the execution means, the introduction means comprising program elements that are specific to voice and added to the software application.

Recourse may optionally also be had to one or more of the following dispositions:

said extraction means, execution means, and introduction means, are integrated in the server, and the server comprises at least one computer;

the server includes digital processor means taken from the following list:
- a voice recognition unit for recognizing voice commands uttered by at least one user;
- a call control unit for extracting from the data stream corresponding to each telephone call, non-audio data corresponding to the telephone call;
- a sound transmit unit for using a network protocol for audio data transmission to transmit over the network output audio data corresponding to at least one event;
- a call transfer unit for managing call transfers for at least one user;
- a read unit for reading at least one instruction relating to the extracted audio data;
- a call transfer instruction unit for implementing a call transfer; and
- a conference setup instruction unit for setting up a conference of at least two calls using non-audio data corresponding to each telephone call; and
- an audio database.

In another aspect, the invention provides a computer program for processing a data stream comprising audio data exchanged over a network between a server and at least one telephone terminal, the data stream corresponding to a telephone call from said terminal during which a user has produced at least one event, the computer program including program code portions for executing the steps of such a method when said program is executed by a computer.

In another aspect, the invention provides a method of preparing a computer program for executing at least one task relating to audio data extracted from a data stream comprising audio data exchanged over a network between a server and at least one telephone terminal, the data stream corresponding to a telephone call from said terminal during which a user has produced at least one event, the audio data corresponding to said event;

the method being characterized in that said computer program is executable by a software application for interacting with the network using a data transmission protocol that is not specifically an audio protocol; and in that the method includes a step in which an insertion sub-module is added to the software application, the sub-module comprising program elements that are specific to voice and adapted to introduce into the software application an instruction relating to the extracted audio data and adapted to activate execution of said task.

Other aspects, objects, and advantages of the invention will appear on reading the following description of various implementations given as non-limiting examples.

BRIEF DESCRIPTION OF THE DRAWINGS

The invention will also be better understood with the help of the accompanying drawings, in which.

DESCRIPTION OF PREFERRED EMBODIMENTS

In the various figures, the same references are used to designate elements that are identical or similar.

Figure 1:
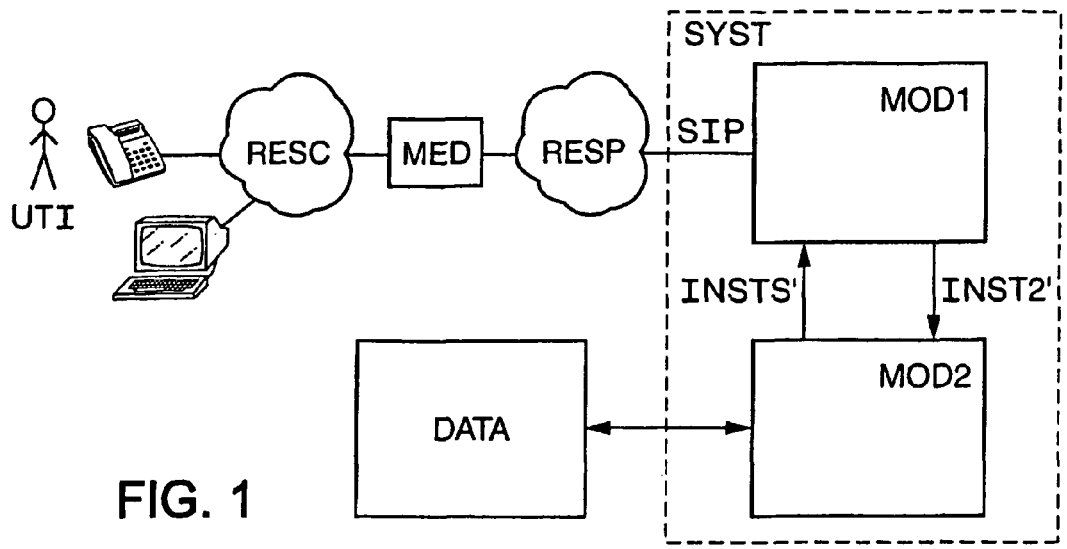
FIG. 1 is an overall block diagram of an IVR application implemented in accordance with the invention.

FIG. 1 is a block diagram showing an example of an interactive voice server implemented in accordance with the invention.

A user UTI, or a group of users, can access a circuit-switched telephone network RESC, e.g. via a telephone or a computer.

Thus, during a telephone call, the user UTI produces sounds. These sounds correspond, for example, to the user's voice or to specific sound signals associated with pressing keys on the telephone terminal. These sounds constitute audio data. In this audio data, some of the data is representative of particular events produced by the user in order to activate a service. By way of example, such an event consists in uttering a particular word for recognition, or in pressing on a specific key of the telephone terminal in use.

Starting from a telephone terminal, the audio data is transmitted together with other communications data (e.g. data identifying the call), thereby constituting a data stream, which stream is carried by the telephone network RESC to a media gateway MED for connecting the circuit-switched telephone network to a packet-switched telephone network RESP, and vice versa. Media gateways of this type are well known to the person skilled in the art (see for example document EP 1 175 074). The data stream is then conveyed to an application system SYST by the packet-switched telephone network RESP using a transport or call setup protocol on this type of network. For example it might be session initiation protocol (SIP) which is an Internet engineering task force (IETF) voice protocol.

The application system SYST is managed by a service supplier. The services supplied correspond to consulting databases (directories, weather data, stock prices, etc.) and/or implementing operations (downloading ring tones or logos for mobile telephones, etc.).

The data stream corresponds to information reaching the service supplier via the application system SYST. The information relates simultaneously to calls set up by one or more users of the service, and to a set of events produced by said user(s). The events can be of any type, e.g. pressing a given key of a telephone terminal, or clicking on a given link of a web page displayed on a computer or other screen, so as to navigate through a menu in order to obtain information or to perform a given operation.

The application system comprises a first module MOD1 which separates out from the data stream, information INST1 belonging to each call set up with each user UTI, and useful audio data corresponding to events suitable for activating one or more services accessible via the server. The first module MOD1 manages information relating to calls and, for each given user UTI, translates instructions INST2' relating to the useful audio data and forwards them to a second module MOD2. The second module MOD2 handles interactivity with the user UTI and outputs instructions INSTS' describing information to be supplied to the user UTI as a function of the translated instructions INST2' it has received. By way of example, this information may relate to a success/fail message concerning the outcome of an operation, or it may relate to information requested by the user.

The first module MOD1 then receives these output instructions INSTS output by the second module MOD2, and uses the SIP network protocol to transmit a set of sounds constituting the response to the events produced by the user UTI. Dialog is thus established between the user UTI and the service supplier, and as a result, not only can a plurality of events be transmitted by the user UTI to receive appropriate responses supplied by the service supplier, but also the characteristics of the call can vary over time. The first module MOD1 is used for handling variation in the characteristics of the call, while the second module MOD2 is used for handling the responses to the various requests made be the user UTI or by a group of users.

By way of example, the service may consist in exchanging data with a database DATA.

Communication between the packet-switched telephone network and the first module MOD1, and also between the first and second modules MOD1 and MOD2 takes place using the SIP protocol, for example. Interactivity within the second module MOD2 is handled, by way of example, in a language known as hypertext preprocessor (PHP) language, or javascript, etc.

An example of an application system SYST of the invention is described with reference to FIG. 2. In this application system, events correspond, by way of example, to sounds generated by pressing on the keys of a telephone terminal. The data stream coming from the packet-switched telephone network reaches the first module MOD1. The first module MOD1 essentially comprises a call controller CONT and an instruction generator GEN.

More particularly, in the first module MOD1, the data stream is forwarded to the call controller CONT. The call controller CONT manages inputting and outputting the data exchanged between the packet-switched telephone network and the first module MOD1 using the SIP protocol. It processes the functions of setting up and supervising a voice call. It manages the unique ID of the call in the application system and all of the functions of the SIP protocol. For a given user, it transfers the instructions INST2 relating to events to the instruction generator GEN. The instruction generator GEN detects that the user UTI at the other end of the line has produced a given event, such as pressing on the "*" key of a telephone, and it translates this information corresponding to the instruction INST2 into an instruction INST2' that it forwards to the second module MOD2.

The second module MOD2 mainly comprises a software application AL written in a high-level language that may be compiled or interpreted. This software application AL may have been developed to provide a service via the Internet without necessarily being specifically adapted to receive voice instructions. The software application is generally designed to interact with the network RESP by using a data transmission protocol that is not specifically for audio purposes, for example the Internet protocol (IP). That is why this second module MOD2 further contains an insertion sub-module SM. The insertion module SM serves, where necessary, to add additional instructions INSTA to the instructions INST2' so that the instructions INST2 that are specific to the voice domain can be used in the code of the high level language.

By means of the insertion sub-module SM, an instruction reader unit LINST of the software application is capable of understanding the instructions INST2' issued by the instruction generator GEN, and can thus activate tasks programmed in the high language as developed for applications that are not specifically voice applications.

More particularly, the insertion sub-module SM is superposed on the software application AL and adds thereto program elements that are specific to voice and that are written in the code of the high level language, so as to be capable of decoding the instructions INST2' as translated by the event generator GEN, e.g. through command lines that extend between separators of the type <VOCAL> and </VOCAL>. This element may also be subdivided into a plurality of portions distributed over a plurality of computers in the application system, or it may implement system functions so as to take the place of part of the system.

Thus, in one example of the operation of the invention, a software application AL is already programmed, e.g. in the PHP language. The language of the program is recompiled so as to make it possible to use program elements that are specific to voice, such as, for example, a command at_prompt( ). Such a command makes it possible to receive a DTMF signal.

For example, in one given case, the pre-existing software application causes a menu to be displayed on the screen of a remote user's computer, allowing the user to select one from a plurality of functions of the software application by typing a character on the keyboard. On the basis of the pre-existing software application, a developer can add the following program elements to the software application: the command $key=at_prompt( ). The variable "key" (the instruction INST2') takes the value of the key pressed by the user. The corresponding function of the software application is accessed depending on the value of the variable "key" in the same way as it used to be accessed by a user pressing the corresponding key on a keyboard. There is thus no need to redevelop the function in question specifically for the IVR application since it is possible to use the function that already exists in the software application.

In addition, the system could detect whether the user is accessing the software application by telephone or otherwise, in which case the variable "key" takes on either the value supplied by the keyboard (this program element already existing in the software application), or the value supplied by the telephone (this program element being added in the sub-module SM).

The software application AL can thus process the instructions INST2' and supply the response to the event produced by the user UTI.

The software application AL in high-level language need not necessarily have been developed to provide information that is specific to the voice domain, so it might be necessary to go back via the insertion sub-module SM in order to supply an instruction INSTS' via a unit EINST for sending sound-transmit instructions, which instruction INSTS' is then forwarded to a sound transmitter unit EMI in the first module MOD1. Additional instructions INSTA' are optionally added to the instructions INSTS'. The sound transmitter unit EMI may respond to instructions INSTS' by searching for sound elements in a database (not shown), and by encoding them so as to forward to the call controller CONT encoded sound elements suitable for passing over the telephone network. The call controller CONT recovers the coded sound elements, and as a function of the identity of the user UTI, sends to said user the information INSTS relating to the event that was initially produced by the user.

Thus, in one example, the preexisting software application used to cause a confirmation message of the type "your message has been registered" to be displayed on the screen of a remote user's computer. The programming language has been recompiled so that the developer can add to the software application program elements that are specific to voice, such as, for example, a command: at_play(sound_file.al). Such a command serves to cause a sound file of conventional type to be read. On the basis of the preexisting software application, a developer could add thereto, at the appropriate place, a program element comprising the command at_play(confirmation.al) where the sound file confirmation.al plays back "your message has been registered".

Many other commands could be added to the software application in the context of the invention. In particular, provision can be made to update the data file relating to a particular user in a database wherever a remote user hangs up the telephone.

Using an executable program, e.g. developed in C++, the programming language in which the software application was developed is modified so that the programming language can include additional commands such as the command at_play (file.al) or the command at_prompt( ), etc. Starting from the pre-existing software application, it becomes easy to construct an IVR application, by adding a sub-module SM containing, amongst other things, the added program code elements that are specific to voice.

Figure 2:
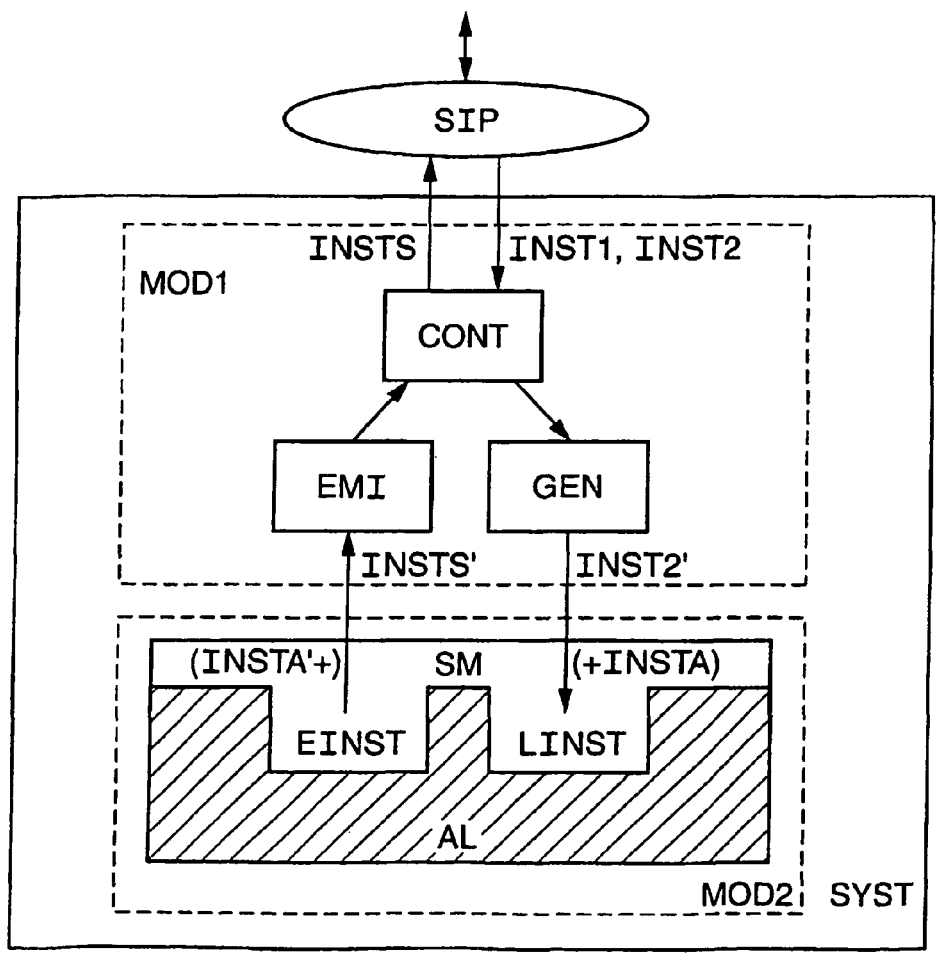
FIG. 2 is a diagram showing the operation of the application system of the invention.

FIG. 2 shows a simple example of the application system SYST of the invention, enabling one or more sounds to be returned to one or more users UTI in response to events produced by the user(s) UTI.

Figure 3:
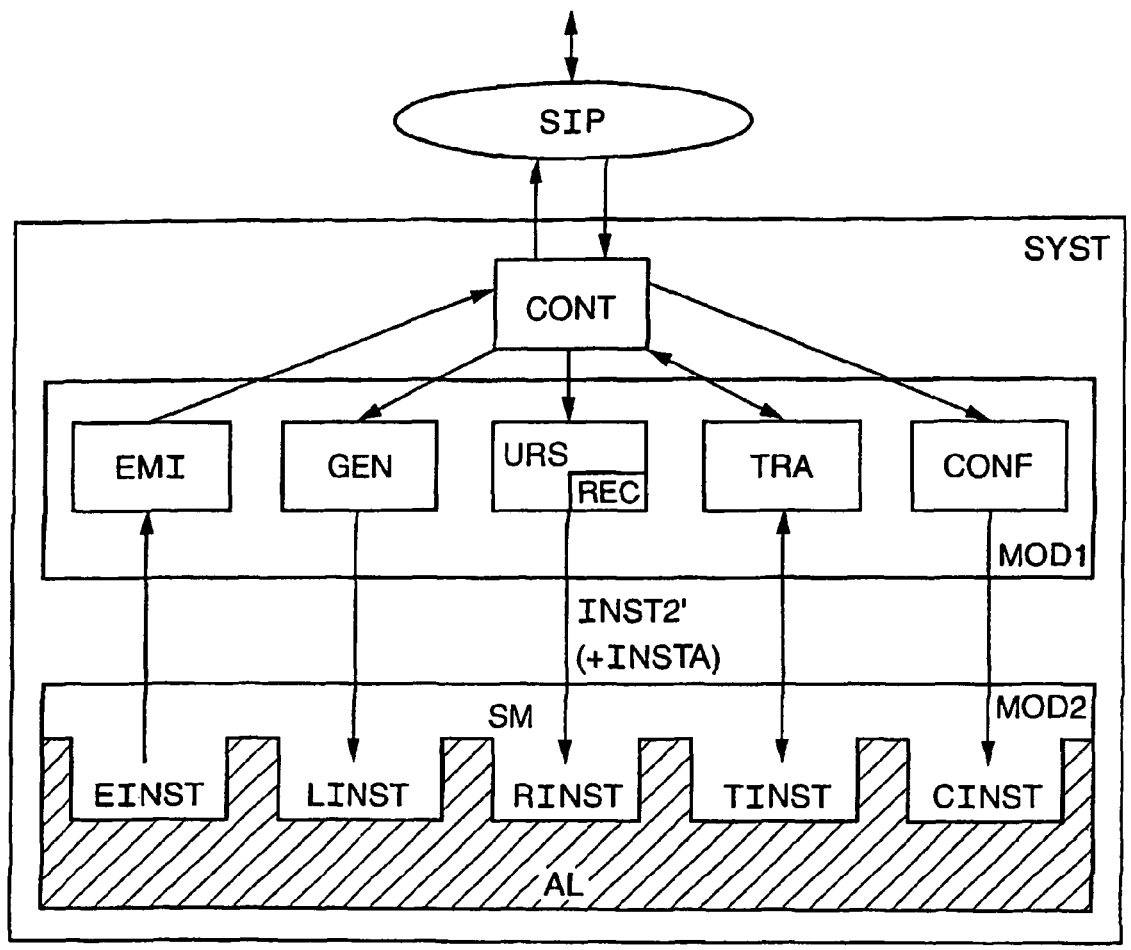
FIG. 3 is a diagram showing the operation of a second implementation of the application system of the invention.

The application system of the invention may implement a collection of other functions, such as those shown in FIG. 3.

As shown in FIG. 3, in addition to the above-described elements of the application system SYST, the application system SYST is fully adapted to allow the user UTI to generate events that are no longer produced exclusively by pressing on the keys of a telephone. It can also process data corresponding, for example, to selections made using a mouse on a page of a document formatted in HTML (hypertext markup language) displayed on a computer screen, or pure voice sounds as uttered by the user UTI.

By way of example, with voice instructions, sounds are picked up by the telephone terminal of the user UTI and then forwarded over the telephone network to a sound receiver unit URS integrated in the first module MOD1. For example, the sounds made by the user UTI are words uttered by the user. The sound receiver unit URS may then, for example, include a voice recognition unit REC capable of recognizing the words uttered by the user UTI, and as a function of the result of such recognition, of forwarding an instruction INST2' to a registration instruction unit RINST. The instruction INST2' may optionally be associated with additional instructions INSTA generated by the insertion sub-module SM so that the registration instruction unit RINST is capable of reading the instruction INST2' via its insertion sub-module SM.

In analogous manner, this application system SYST may also handle functions such as call transfers by means of a call transfer unit TRA and a transfer instruction unit TINST. These functions are implemented using instructions analogous to the above-described instructions INST2' and INSTA. This is an option that enables information to be forwarded to the call controller CONT enabling a call transfer to be handled and supported by the voice protocol of the network, e.g. SIP.

The application system in the example described herein may also, in like manner, put calls from a plurality of users UTI into a conference, at their request, using a conference setup unit CONF and a conference instruction unit CINST.

Figure 4:
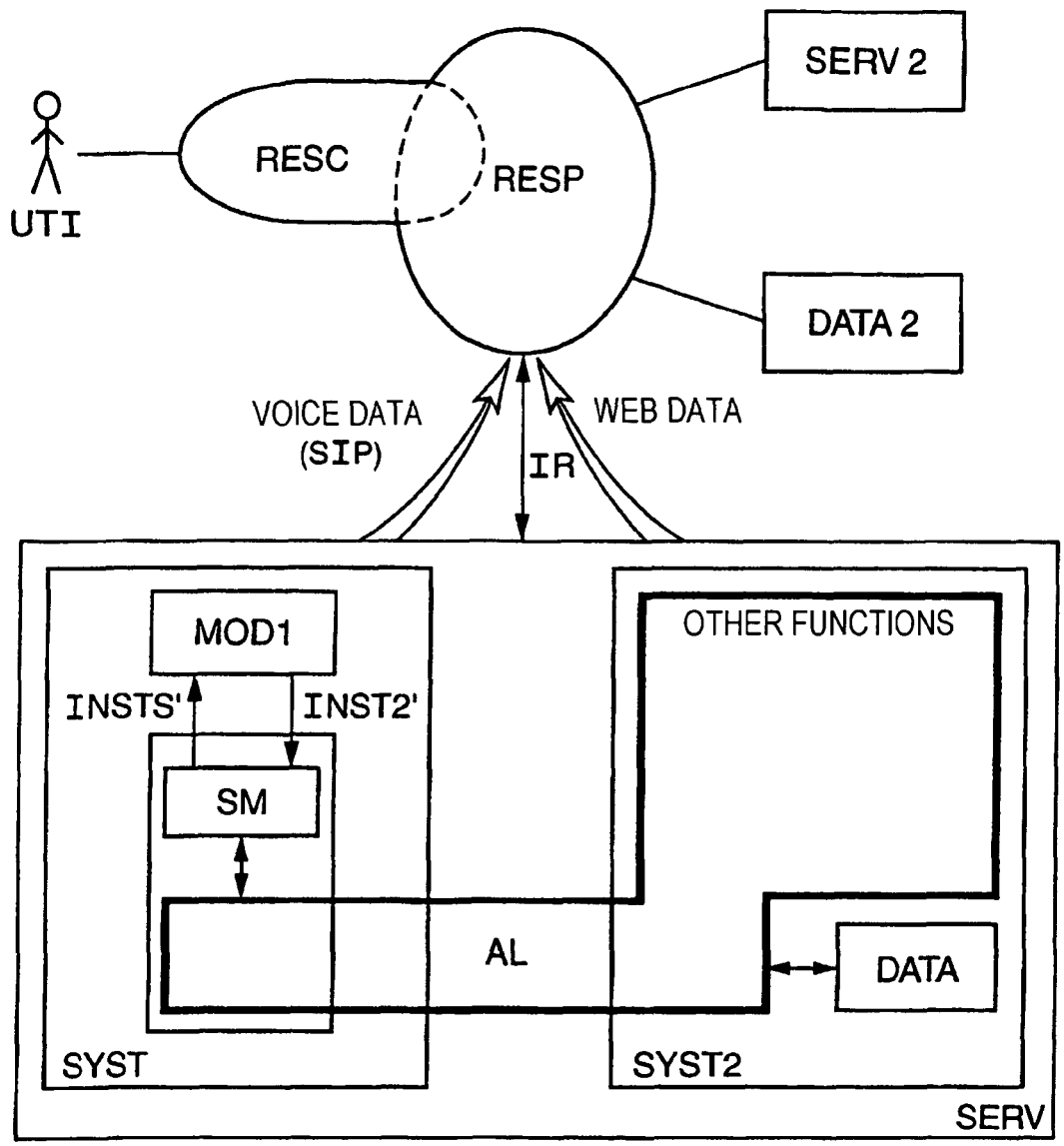
FIG. 4 shows an example of the invention in operation.

An alternative to the example of operation of the invention as described above is described below with reference to FIG. 4. A user or a group of users UTI seeks to access a service, such as one of the services mentioned above, and as supplied by a service supplier over a network RESC. The software application AL capable of responding to this service is located on a remote server SERV, e.g. one based on processors manufactured by Intel. This server operates under an operating system such as Windows, Unix, or Linux, and in addition to the above-described application system SYST also comprises a system SYST2 controlling other functions of the server SERV. The service to which the user UTI seeks access may be provided in a non-voice format, e.g. by the software application AL in the PHP language.

An event generated by a user UTI, e.g. from a telephone handset, is forwarded as explained above via the circuit-switched telephone network RESC to a media gateway MED and a packet-switched network RESP to a server SERV hosting the application. In the present example, the packet-switched network RESP is the Internet, for example. The server SERV is connected to the network RESP via a conventional Ethernet network interface IR.

As explained above, the incoming data stream is processed by a first module MOD1 which manages all aspects relating to the call, and forwards instructions INST2' relating to events generated by the user to the second module MOD2, where they are received by the software application AL via the sub-module SM which transforms the instructions INST2', e.g. using executable software in C++, into the PHP 4.2.2 language as recompiled so as to enable them to be integrated in the software application AL which is itself in PHP language. The software application AL responds to the instructions INST2' by performing appropriate tasks. In particular, a voice response can be reconstituted from data stored in the database DATA. The software application AL can also produce other functions, in particular by interacting with other servers SERV2 and/or databases DATA2 that are remote and accessible over the Internet, for example.

The second module MOD2 is capable of returning output instructions INSTS' to the first module MOD1. The first module transmits directly over the packet-switched network RESP using the network voice protocol SIP, providing information relating to the event generated by the user UTI in voice form.

In addition, depending on the stream of data generated by the user UTI, the system SYST2 may, for example, communicate data specific to the user to the remote database DATA2 via the packet-switched network RESP.

The invention claimed is:

1. A non-transitory computer readable medium having embodied therein a computer program including instructions for causing a processor to execute at least one task relating to audio data extracted from a data stream for performing a method of processing the data stream comprising audio data exchanged over a network between a server and at least one telephone terminal, the data stream corresponding to a telephone call from said terminal during which a user has produced at least one event by pressing on at least one key of the telephone terminal, the audio data corresponding to said event, the method comprising the steps of:
  providing that said at least one task is executable by a non-voice-specific software application that is programmed in a language developed for applications that are not specifically voice applications, and that is for interacting with the user through the network using a data transmission protocol which is not specifically an audio protocol;
  modifying said language so as to make it possible to use program elements that are specific to voice, and
  adding an insertion sub-module to the non-voice-specific software application, the sub-module comprising said program elements that are specific to voice and adapted to introduce into the non-voice-specific software application an instruction relating to the extracted audio data and adapted to activate execution of said at least one task.

2. The method according to claim 1 wherein the non-voice-specific software application is programmed in one of PHP and Javascript.

3. The method of claim 1, wherein the non-voice-specific software application is adapted to handle interactivity.

4. The method of claim 1, wherein the non-voice-specific software application is adapted to handle responses to various requests made by the user.

5. The method according to claim 1, in which the non-voice-specific software application is written in a language, and in which the program elements specific to voice that are added to the non-voice-specific software application are written in the same language.

6. The method according to claim 1, in which the event is produced by the user uttering a voice command, and further comprising recognizing the uttered voice command by means of a voice recognition unit.

7. The method according to claim 1, in which the non-voice-specific software application is adapted to execute tasks that are equivalent in terms of services given to the user whether implemented over an Internet or Intranet network or over a telephone network.

8. The method according to claim 1, further including managing changes in the telephone call on the basis of non-audio data extracted from the data stream.

9. The method according to claim 1, further including using a protocol for transmitting audio data over a network to transmit output audio data over the network as delivered in response to at least one event produced by the user.

* * * * *